May 2, 1961  O. L. LANCE  2,982,565
TRAILER HITCH EQUALIZERS
Filed April 5, 1960
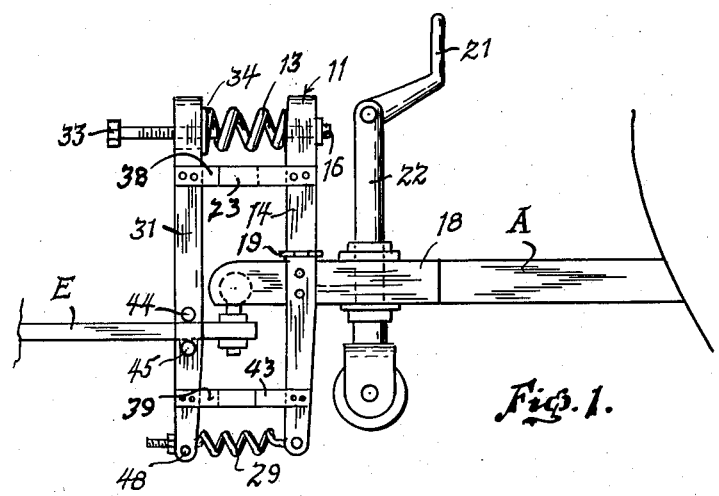
Fig. 1.
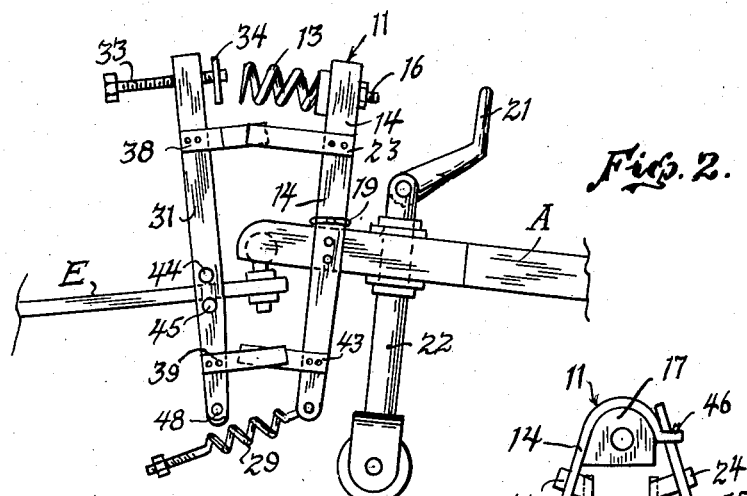
Fig. 2.
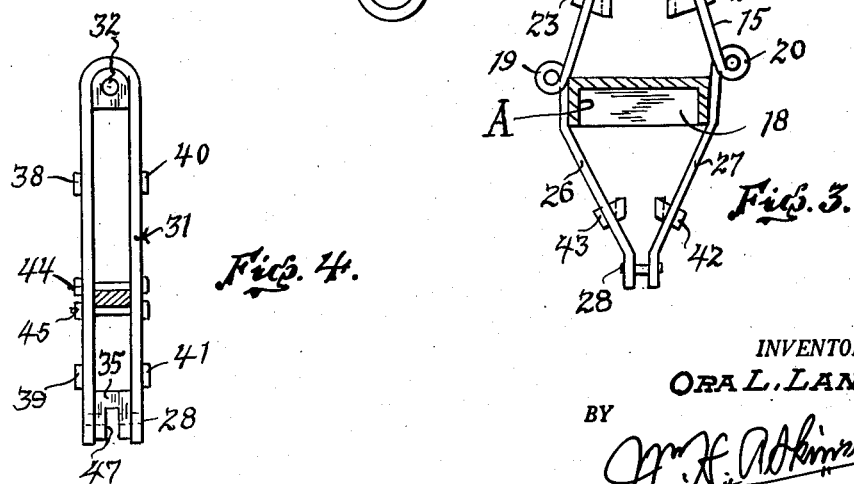
Fig. 3.
Fig. 4.
INVENTOR.
ORA L. LANCE.
BY
ATTORNEY ns # United States Patent Office 2,982,565
Patented May 2, 1961

2,982,565
TRAILER HITCH EQUALIZERS
Ora L. Lance, 615 Wright St., Santa Rosa, Calif.
Filed Apr. 5, 1960, Ser. No. 20,184
3 Claims. (Cl. 280—406)

This invention relates to new improvements in trailer hitches and is of compact and simple construction, yet effective in relieving the rear wheels of the towing vehicle of some of the weight and distributing it to the front wheels, thus preventing the rear of the towing vehicle from being depressed by the weight exerted by the vehicle being towed, and also exerting more pressure on the front wheels.

Another object is to provide means to stabilize the trailer and prevent its rolling or dipping while being towed.

Another important object is to eliminate the difficulty encountered in the use of other trailer hitch equalizers of exerting too much added forward thrust or rearward pull on the conventional ball and socket joint connection.

These and other objects will appear from the following description of the drawings and the appended claims in which like reference characters designate like parts, in which—

Figure 1 is a side elevation of the hitch also showing a part of the trailer tongue, the ball and socket joint and the draw-bar of the towing vehicle as it appears in towing position.

Figure 2 is a side elevation showing the front part of the trailer tongue and the rear of the towing vehicle slightly raised in which position this device does not interfere with the usual method of connecting a trailer to the towing vehicle since one end of each spring means are disconnected.

Figure 3 is a longitudinal view, partly in section of the device attached to the tongue of the trailer.

Figure 4 is a longitudinal view partly in section showing that part of the device attached to the drawbar of the towing vehicle.

While I have shown only the preferred form of my invention it is understood that various changes or modifications may be made within the scope of the appended claims.

Referring now in more detail to the drawings the trailer is shown with the usual frame; one member of which extends under the floor of the trailer near one side and another member in like manner near the opposite side; the forward ends of which are designated by the letter A, extend forward to a point in front of the trailer where they meet and carry the usual plate 18, provided with the socket part of a ball and socket joint; this plate also carries the usual screw device or jack 22, the purpose of which is to lower or raise the front of the trailer.

Rigidly secured to the sides and near the front of the extension A I have provided a frame 11, shown separately in Figure 3, to the lower end of frame 11 is secured a tension spring 29.

Rigidly secured to the upper end of member 14 is a plate 17 to which one end of the spring 13 is rigidly secured by a bolt 16. Both members 14 and 15 are provided with hinges 19 and 20 so they may swing downward to permit the handle 21 of the jack 22 to be turned when lowering or raising the trailer tongue. The free end of member 14 extends outward and is provided with a slot 46 to receive the free end of member 15 in which position it is retained by a pin 12 being inserted in a hole to receive it. Member 15 is mounted by means of a hinge 20 and carries leaf spring 24. The lower half of frame 11 is comprised of members 26 and 27 which extend downward at an angle and are connected by a bolt 28. The bolt 28 passes through an eye in the end of tension spring 29.

Attached by bolts 44 and 45 to the draw bar E of the towing vehicle is a frame 31, a longitudinal view of which is shown by Figure 4. Secured in the upper part of this frame is a block 37 having a threaded hole 32 to receive a bolt 33 which carries a disc 34 as seen in Figures 1 and 2. In the lower end of frame 31 is secured a block 35 provided with a slot 47 to receive the free end of tension spring 29 which is held in place while in operation by means of a pin 48 being passed through a hole below the shank of spring 29. To the frame 31 are rigidly secured leaf springs 38, 39, 40 and 41 which extend toward and are adapted to slidably engage the leaf springs 23, 24, 42 and 43 and thus restrain the trailer from leaning from one side to the other while being towed. As illustrated in the drawing the upper leaf springs 23 and 24 are disposed to engage the outer surfaces of the leaf springs 38 and 40 and the lower leaf springs 42 and 43 as carried by the frame member 11 are disposed to extend between the leaf springs 39 and 41. To this end the leaf springs 23 and 24 are bent inwardly as illustrated in Figure 3 so that their projecting ends are spaced to engage with the outer surfaces of the leaf springs 38 and 40, whereas at the lower part of the frame 11 the leaf springs 42 and 43 extend inwardly and are formed to extend between the leaf springs 39 and 41 carried by the frame member 31.

To more fully explain the operation of this trailer hitch equalizer, it will be seen that weight imposed on the rear of the car would normally force it downward, but this is avoided with this attachment installed because in order for it to be forced downward spring 13 would have to be compressed and at the same time spring 29 would be stretched or lengthened. Since it is necessary to have some give or play at the joint when going over a bump or depression in the road, these springs will allow enough play to prevent damage.

With the novel arrangement of the compression spring 13 urging the trailer backward and a tension spring 29 pulling it forward, the strain on the ball and socket joint is equalized. At the same time the pairs of leaf springs 23—24 and 42—43 carried by the car and one set carried by the trailer and forming a sliding contact at their free ends will help prevent a leaning or swaying movement of the trailer without interfering with free vertical hinging between the tongue A of the trailer and the toe-bar E.

The trailer is connected to the car in the usual way, and when the trailer tongue is lowered onto the ball joint that part of the hitch carried by the trailer and that part carried by the car automatically move into operating position. The only additional work to be done is to raise the free end of spring 29 into the slot and insert retaining pin 48.

What I claim is:
1. In a trailer hitch of the character described, the combination of a trailer having a forwardly extending tongue, a towing vehicle having a rearwardly extending drawbar, said tongue and drawbar being connected at their ends by a conventional ball joint trailer hitch, a vertically extending frame mounted upon said tongue rearwardly of said ball joint and extending above and below the axis of said ball joint, a second frame secured to said drawbar forward of said ball joint and in co- extending parallel relation with said vertically extending frame, a compression spring normally under compression between the upper ends of the frame carried by said tongue of the trailer and the second frame carried by the drawbar of the towing vehicle, means for adjusting the degree of compression of said spring when in its normal operating position, and a tension spring removably connected between the lower ends of the frame carried by the tongue of the trailer and the second frame member carried by the drawbar of the towing vehicle, whereby said compression spring and said tension spring will tend by their combined action to cushion and limit vertical hinge-wise movement between the tongue of the trailer and the draw-bar of the towing vehicle.

2. In a trailer hitch of the character described, the combination of a trailer having a forwardly extending tongue, a towing vehicle having a rearwardly extending drawbar, said tongue and drawbar being connected at their ends by a conventional ball joint trailer hitch, a vertically extending frame mounted upon said tongue rearwardly of said ball joint and extending above and below the axis of said ball joint, a second frame secured to said drawbar forward of said ball joint and in co-extending parallel relation with said vertically extending frame, a first pair of oppositely disposed leaf springs carried by said vertically extending frame and said drawbar in meeting slidable relation at the upper ends of said vertically extending frame and said drawbar, and a second pair of slidably related leaf springs mounted upon the lower ends of said vertically extending frame and said second frame member operating in conjunction with said first pair of leaf springs and said ball joint to limit any swaying action of the trailer with respect to the drawbar of the towing vehicle.

3. In a trailer hitch of the character described, the combination of a trailer having a forwardly extending tongue, a towing vehicle having a rearwardly extending drawbar, said tongue and drawbar being connected at their ends by a conventional ball joint trailer hitch, a vertically extending frame mounted upon said tongue rearwardly of said ball joint and extending above and below the axis of said ball joint, a second frame secured to said drawbar forward of said ball joint and in co-extending parallel relation with said vertically extending frame, a compression spring normally under compression between the upper ends of the frame carried by said tongue of the trailer and the second frame carried by the drawbar of the towing vehicle, means for adjusting the degree of compression of said spring when in its normal operating position, a tension spring removably connected between the lower ends of the frame carried by the tongue of the trailer and the second frame member carried by the drawbar of the towing vehicle, whereby said compression spring and said tension spring will by their combined action cushion and limit vertical hinge-wise movement between the tongue of the trailer and the drawbar of the towing vehicle, a first pair of oppositely disposed leaf springs carried by said vertically extending frame and said drawbar in meeting slidable relation at the upper ends of said vertically extending frame and said drawbar, and a second pair of slidably related leaf springs mounted upon the lower ends of said vertically extending frame and said second frame member operating in conjunction with said first pair of leaf springs and said ball joint to limit any swaying action of the trailer with respect to the drawbar of the towing vehicle.

References Cited in the file of this patent

UNITED STATES PATENTS

| | | |
|---|---|---|
| 2,448,436 | Jones | Aug. 31, 1948 |
| 2,549,814 | Hume | Apr. 24, 1951 |
| 2,709,604 | Hartman | May 31, 1955 |
| 2,879,884 | Joy | Mar. 31, 1959 |

FOREIGN PATENTS

| | | |
|---|---|---|
| 211,472 | Germany | July 1, 1909 |